(12) United States Patent
Black et al.

(10) Patent No.: US 9,807,943 B1
(45) Date of Patent: Nov. 7, 2017

(54) HANDHELD APPARATUS AND METHOD FOR TRIMMING A PLANT

(71) Applicant: Easy Trim LLC, Broomfield, CO (US)

(72) Inventors: Joseph Black, Broomfield, CO (US); Michael Cross, Broomfield, CO (US)

(73) Assignee: Easy Trim LLC, Broomfield, CO (US)

( * ) Notice: Subject to any disclaimer, the term of this patent is extended or adjusted under 35 U.S.C. 154(b) by 0 days.

(21) Appl. No.: 15/654,167

(22) Filed: Jul. 19, 2017

Related U.S. Application Data

(63) Continuation of application No. 15/115,888, filed as application No. PCT/US2015/014485 on Feb. 4, 2015.

(60) Provisional application No. 61/937,061, filed on Feb. 7, 2014.

(51) Int. Cl.
*A01G 3/08* (2006.01)
*A01G 3/053* (2006.01)

(52) U.S. Cl.
CPC ............. *A01G 3/08* (2013.01); *A01G 3/0535* (2013.01)

(58) Field of Classification Search
CPC ................................ A01G 3/08; A01G 3/0535
See application file for complete search history.

(56) References Cited

U.S. PATENT DOCUMENTS

| | | | | |
|---|---|---|---|---|
| 1,723,151 A * | 8/1929 | Goodwin | ............... | A01D 46/10 56/13.2 |
| 3,732,858 A * | 5/1973 | Banko | ................ | A61B 10/0266 600/566 |
| 3,945,375 A * | 3/1976 | Banko | ..................... | A61B 10/04 600/104 |
| 4,964,472 A * | 10/1990 | Cleworth | ................. | A01B 1/16 111/7.2 |
| 5,176,628 A * | 1/1993 | Charles | ................ | A61F 9/00763 604/22 |
| 5,588,289 A * | 12/1996 | Wilson | ................. | A01G 3/0535 30/124 |
| 5,685,838 A * | 11/1997 | Peters | .............. | A61B 17/32002 600/566 |
| 5,862,595 A * | 1/1999 | Keane | ..................... | A01D 34/90 30/124 |
| 6,743,245 B2 * | 6/2004 | Lobdell | ............... | A61F 9/00763 600/565 |
| 6,751,871 B2 * | 6/2004 | Furnish | ................. | A01D 34/90 30/276 |
| 7,107,887 B2 * | 9/2006 | Whited | ................. | B26B 25/002 30/123 |
| D618,253 S * | 6/2010 | Wilson | ..................... | A01C 5/02 D15/10 |

(Continued)

*Primary Examiner* — Sean Michalski
(74) *Attorney, Agent, or Firm* — Perkins Coie LLP

(57) ABSTRACT

The present application provides a handheld plant trimming apparatus. The handheld plant trimming apparatus, in one aspect, includes a wand having a longitudinal axis. The wand includes a wand inlet tube defining a void and an elongate slot, an outlet port having a through bore parallel to the wand longitudinal axis and an outlet bore where the outlet bore is in fluid communication with the void, and a handle. A cutting element is contained in the wand inlet tube and coupled to a motor to provide rotative force to the cutting element. A drum is in fluid communication with the wand and a vacuum pulls plant parts that are cut by the cutting element from the wand to the drum.

15 Claims, 11 Drawing Sheets

(56) References Cited

U.S. PATENT DOCUMENTS

| | | | | |
|---|---|---|---|---|
| 8,161,652 B2* | 4/2012 | Delfini | ............... | B23D 59/006 |
| | | | | 30/124 |
| 8,251,917 B2* | 8/2012 | Almazan | ............ | A61B 10/0275 |
| | | | | 600/566 |
| 8,298,253 B2* | 10/2012 | Charles | ............... | A61F 9/00763 |
| | | | | 604/22 |
| 8,430,824 B2* | 4/2013 | Videbaek | ........... | A61B 10/0275 |
| | | | | 600/562 |
| 8,690,793 B2* | 4/2014 | Ranpura | ............ | A61B 10/0275 |
| | | | | 600/562 |
| 8,914,981 B1* | 12/2014 | Paez | .................... | A01M 21/02 |
| | | | | 30/124 |
| 9,078,640 B1* | 7/2015 | An | .................... | A61B 10/0283 |
| 9,258,943 B1* | 2/2016 | Ruger | .................. | A01D 43/077 |
| 2008/0189870 A1* | 8/2008 | Dayton | ................... | A01C 5/02 |
| | | | | 7/167 |
| 2012/0279193 A1* | 11/2012 | Mosman | ............... | A01G 17/00 |
| | | | | 56/233 |

* cited by examiner

HANDHELD APPARATUS AND METHOD FOR TRIMMING A PLANT

CROSS-REFERENCE TO RELATED PATENT APPLICATIONS

The present application is a continuation of U.S. patent application Ser. No. 15/115,888, filed Aug. 1, 2016, titled "HANDHELD APPARATUS AND METHOD FOR TRIMMING A PLANT," which is a 35 USC §371 National Stage application of International Application No. PCT/US2015/014485, filed Feb. 4, 2015, titled "HANDHELD APPARATUS AND METHOD FOR TRIMMING A PLANT," which claims priority to U.S. Provisional Patent Application Ser. No. 61/937,061, filed Feb. 7, 2014, titled "HANDHELD APPARATUS AND METHOD FOR TRIMMING A PLANT," the disclosure of which are incorporated herein by reference as if set out in full.

BACKGROUND

Small volume agricultural crops need to be harvested similar to a higher volume or a mass produced volume of crops. Unfortunately, most of the harvesting tools are not viable or economical for the harvesting of certain spices and herbs, such as for example, rosemary, mint, oregano, basil, cilantro, medicinal herbs, and the like. It is often necessary to hand trim with a scissor (or pick) the flowers and plants associated with these crops, especially when smaller volumes are produced.

Hand trimming crops often involves using a scissor to cut, rather than tear, portions of the plant while manipulating the crops. This is a labor intensive process that can become manually taxing over time as more product is handled and trimmed. To facilitate the process, many tools and devices have been developed to automatically trim plants, for example, separating the leaves from the stems. One particularly effective automatic plant trimmer is described in International Patent Application WO 2013/090779, filed Dec. 14, 2012, titled PLANT TRIMMING APPARATUS AND METHODS OF USING THE SAME, the disclosure of which is incorporated herein as if set out in full. WO 2013/090779 provides a relatively large container and a series of grates, blades, and fans to trim the product. A unique bagging system allows the constituent components of the plants being harvested to be separated. The plant trimmer of WO 2013/090779 is not a hand trimming device, however.

Automatic trimmers, such as the above described automatic trimmer, are often expensive and more effective at higher volumes of plant harvesting. While the above described plant trimmer is effective, hand trimming of plants is still gentler on the plants and more cost effective for lower volumes.

Accordingly, there is a need for a handheld automatic trimmer that is more cost effective for harvesting plants.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

The technology of the present application provides a handheld plant trimming apparatus. The handheld plant trimming apparatus, in one aspect, includes a wand having a longitudinal axis. The wand includes a wand inlet tube defining a void and an elongate slot, an outlet port having a through bore parallel to the wand longitudinal axis and an outlet bore where the outlet bore is in fluid communication with the void, and a handle. A cutting element is contained in the wand inlet tube and coupled to a motor to provide rotative force to the cutting element. A drum is in fluid communication with the wand and a vacuum pulls plant parts that are cut by the cutting element from the wand to the drum.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

Embodiments of the technology of the present application are described more fully below with reference to the accompanying figures, which form a part hereof and show, by way of illustration, specific exemplary embodiments. These embodiments are disclosed in sufficient detail to enable those skilled in the art to practice the technology disclosed herein. However, embodiments may be implemented in many different forms and should not be construed as being limited to the embodiments set forth herein. The following detailed description is, therefore, not to be taken in a limiting sense. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary. As mentioned above, hand trimming as is allowed by the technology of the present application is gentler on plants than industrial or large plant trimming apparatuses in the normal course. The hand trimming technology of the present application advantageously also allows for the harvested material to be hang dried prior to curing rather than using drying racks prior to curing, which some growers prefer.

Figure 1:
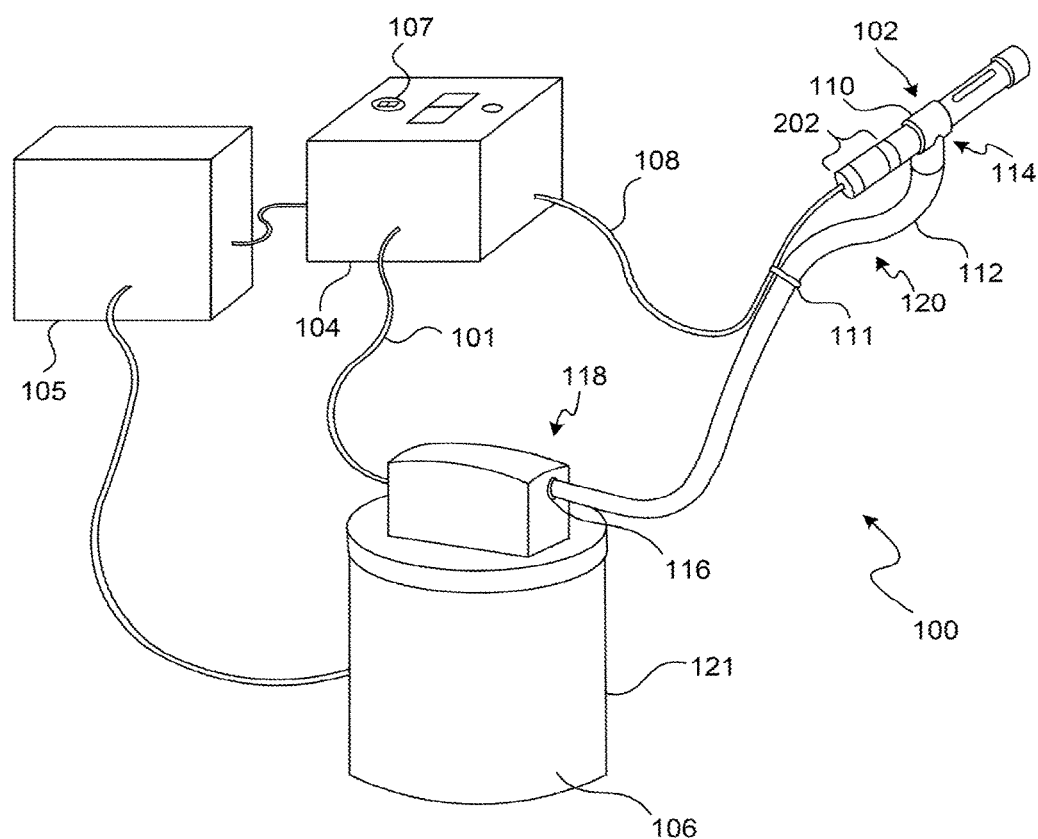
FIG. 1 depicts a functional block diagram of an automatic plant trimming system consistent with the technology of the present application.

FIG. 1 shows an automatic handheld plant trimming system 100. The automatic handheld plant trimming system 100 includes a wand 102, a motor 104 (which may have an external power source 105 such as a wall socket to grid power or a battery pack as shown), and a vacuum 106, which is shown as a conventional wet/dry vacuum, but could be any conventional suction pump. The motor 104 is connected to the wand 102 via a drive 108. The drive 108 is shown as a flexible cable to facilitate the movement of the handheld wand 102. In operation, the rotation of the motor causes the drive 108 to rotate.

The motor 104 may be a variable speed motor with a speed controller 107. The speed controller 107 optionally is coupled to the vacuum 106 via cable 101 as well to allow coordination between the wand 102 speed and the vacuum 106 speed as will be explained further below. The vacuum 106 may be provided with a separate variable speed drive as a matter of design choice. The wand 102 has a port 110 to which a flexible conduit 112 is attached. The flexible conduit 112 is coupled to the port 110 on a first end 114 and the vacuum 106 inlet port 116 on a second end 118 opposite the first end. The vacuum 106 also has a discharge with a filtration system as will be explained further below. The flexible conduit 112 may be coupled to one or both of the wand 102 or the drive 108 using one or more ties 111. The ties may comprise twist ties, VELCRO® hook and loop ties, or the like. Coupling the flexible conduit 112 in this manner facilitates operation of the device. Moreover, the flexible conduit 112 and a wand handle 202 of the wand 102 may be coupled in a manner to form a loop 120 construct similar to, for example, a saber grip. The vacuum 106 may be provided with a separate variable speed drive and motor as a matter of design choice. The automatic handheld plant trimming system 100 may be provided with a female socket to receive a male plug such that the vacuum 106 motor and controller may be powered from the system power supply (whether a battery pack, generator, or wall socket).

Figure 2:
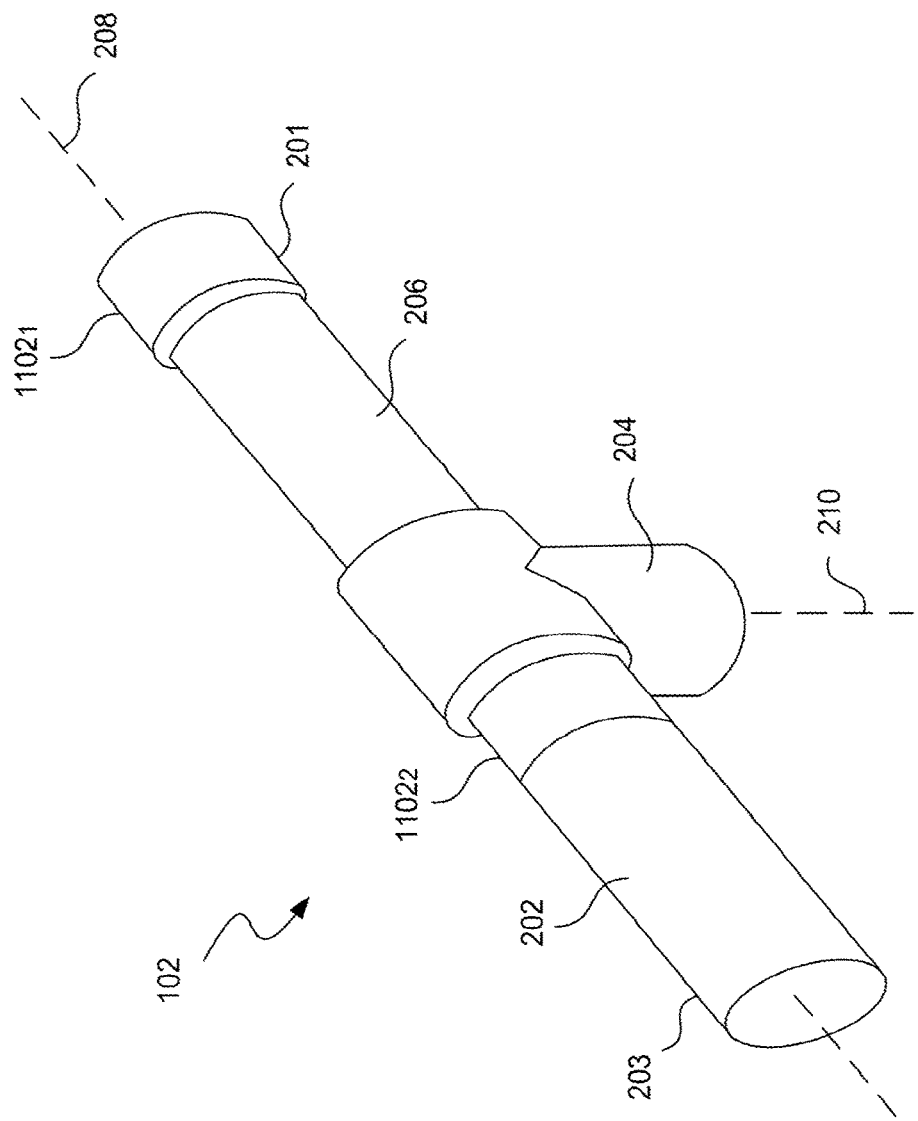
FIG. 2 depicts the wand of the automatic plant trimming system of FIG. 1.

With reference now to FIG. 2, the wand 102 is shown in more detail. The wand 102 includes the aforementioned wand handle 202, an outlet port 204, and a wand inlet tube 206. The wand 102 may comprise a single monolithic unit or may be modular. The wand 102 forms a generally cylindrical tube having a wand axis 208 extending longitudinally from a wand tip 201 to a wand base 203. The outlet port 204 has a port axis 210 generally perpendicular to the wand axis 208. While the outlet port 204 is shown roughly centered on the wand 102 between the wand handle 202 and the wand inlet tube 206, the outlet port could be located in alternative locations. Additionally, the outlet port 204 could be located at a base 203 of the wand handle 202 and arranged such that the port axis 210 is parallel to the wand axis 208. The port axis 210 is currently shown perpendicular to the wand axis 208. As mentioned, the port axis 210 being parallel (or offset by zero degrees) to the wand axis 208 is possible, and would facilitate movement of product. Reducing the angle of the port axis 210 to wand axis 208 to less than about forty-five degrees facilitates movement of product. In some embodiments, the angle should be less than about twenty degrees. Of course, any angle between zero and ninety is possible.

Figure 3:
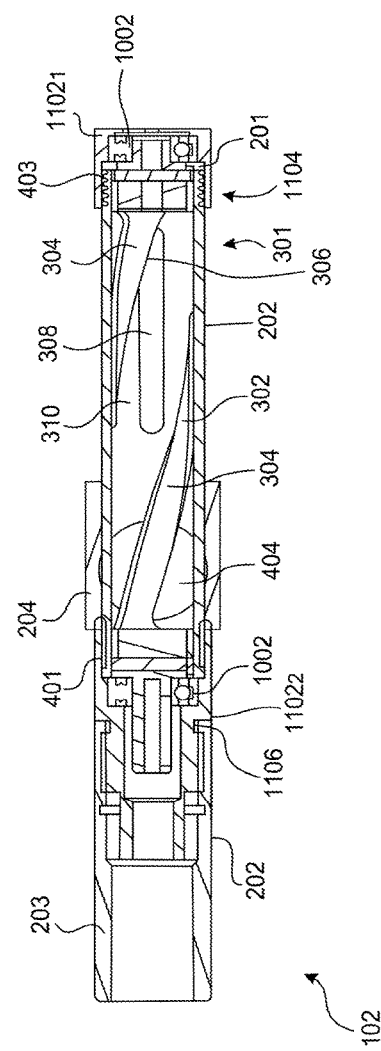
FIG. 3 depicts a cross section view of the wand of FIG. 2.
Figure 4:
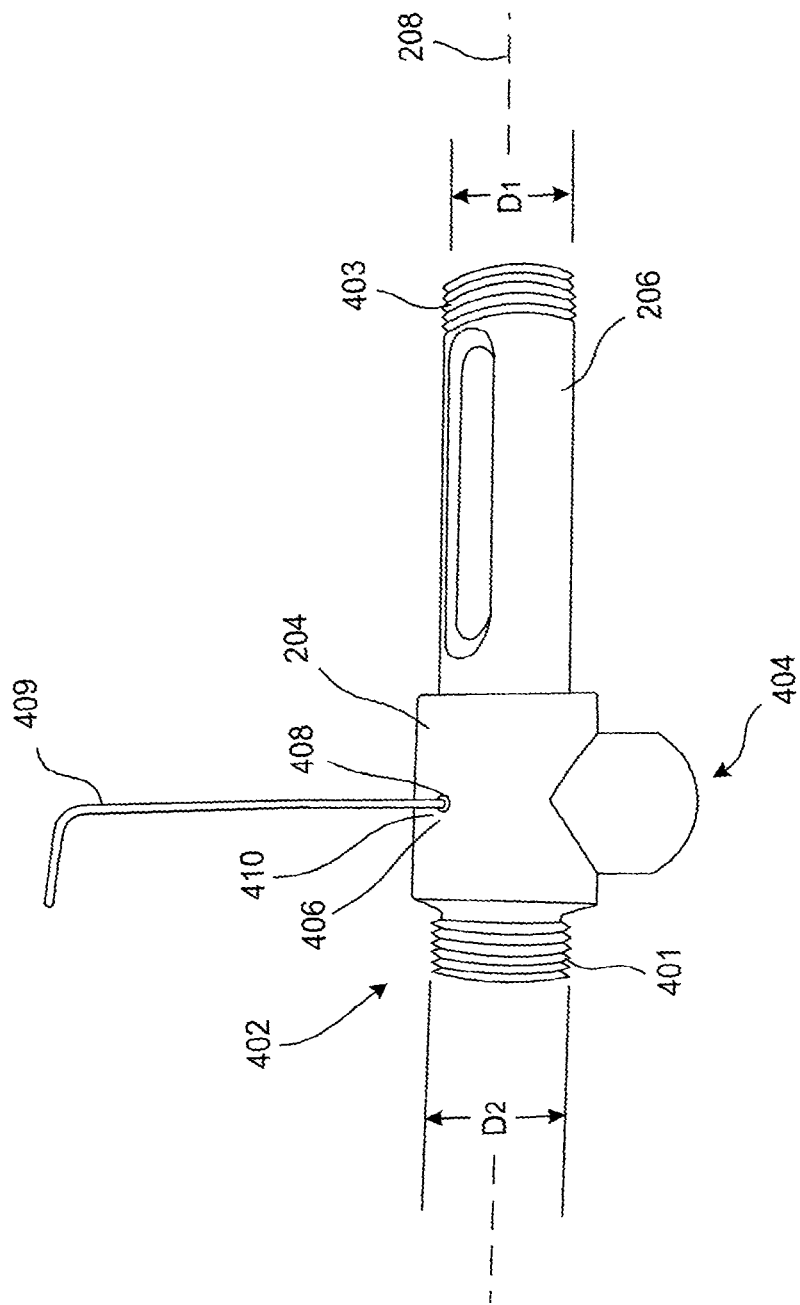
FIG. 4 depicts a perspective view of a portion of the wand of FIG. 2.
Figure 5:
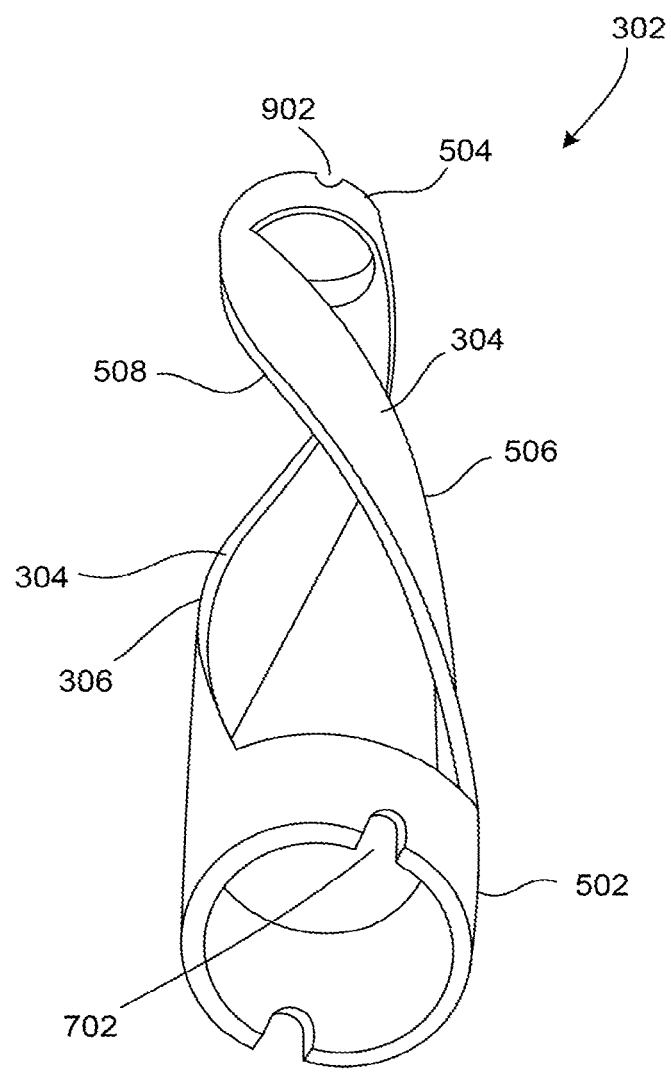
FIG. 5 depicts a perspective view of a cutting element consistent with the technology of the present application.

FIG. 3 shows a cross section of the wand 102. The wand 102 houses a hollow, cylindrical cutting element 302 (best seen in FIG. 5), which is shown as a pair of helically shaped blades 304 each having a leading edge cutting surface 306. While shown as helically shaped, the cutting elements 302 may be any curved shape. The wand inlet tube 206 has an elongated slot 308 that has a cutting edge 310. The elongated slot 308 allows plant product access to the cutting area where the cutting surface 306 and the cutting edge 310 meet. The cutting element 302 has an outer diameter about equal to the inner diameter of the wand inlet tube 206 to minimize any gap between the cutting surface 306 and the cutting edge 310. The helical shape of the blades 304 in part simulate a scissor motion comparable to handheld scissors for trimming. As will be explained further below, the vacuum 106 provides a suction force at the elongated slot 308 through the flexible conduit 112 and wand outlet port 204. The suction force helps draw and stand the plant product in the elongated slot 308 such that the cutting surface 306 forces the plant product against the cutting edge 310 to provide a cut or shearing force, similar to a scissor, to slice rather than tear the plant product, which minimizes damage to the plant product.

Figure 14:
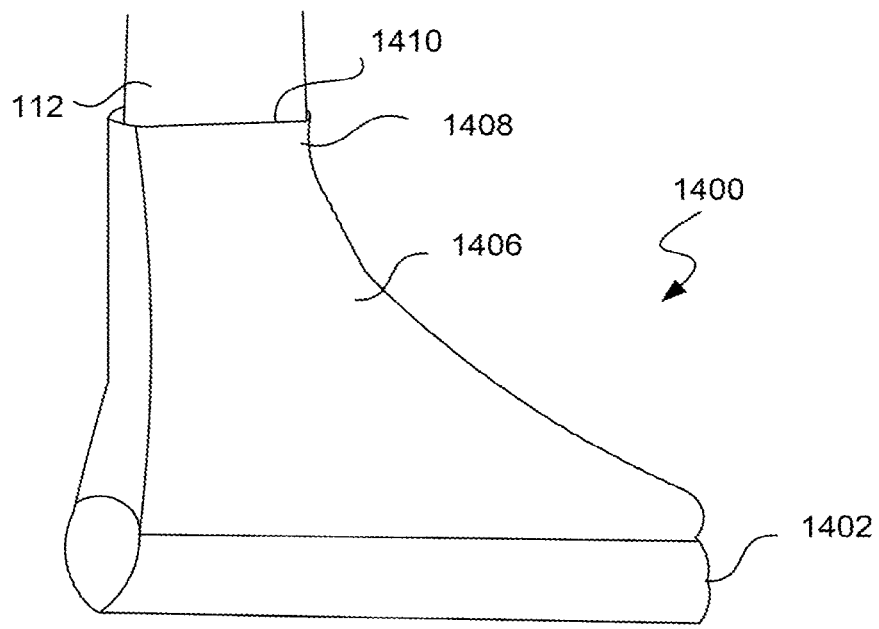
FIG. 14 depicts an alternative outlet port consistent with the technology of the present application.

With reference to FIGS. 4-12, the parts of the wand 102 will be described in some detail. The parts will be described in connection with the assembly of a modular wand 102. However, the wand 102, or certain component parts explained herein, may be a monolithic unit or units in certain embodiments. First, the outlet port 204 is coupled to the wand inlet tube 206. The wand inlet tube 206 has an outer diameter $D_1$. The outlet port 206 comprises a through bore 402 generally collinear with the wand axis 208. The through bore 402 has an inner diameter $D_2$ slightly larger than the outer diameter $D_1$ to allow the wand inlet tube 206 to be slidingly received in the through bore 402. As shown, a portion first thread 401 on the wand inlet tube 206 extends beyond the outlet port 204. The wand inlet tube 206 has a second thread 403 arranged on the opposite side of the wand inlet tube 206 from the first thread 401. The threads will be further explained below. The outlet port 206 has an outlet bore 404 (see FIG. 3) that is shown substantially perpendicular to the through bore 402. The outlet bore 404 is shown substantially cylindrical, but could have alternative shapes to facilitate movement of the plant material from the wand 102 into the flexible conduit 112. One of many possible outlet ports have an alternative outlet bore as shown in FIG. 14.

The wand inlet tube 206 and the outlet port 204 may be frictionally engaged. Alternatively, the connection may be a snap fit connection. In still other embodiments, the outlet bore 204 may include a locking bore 406 or bores 406 capable of receiving a set screw 408 or set screws 408s that is/are receivable in an aligned, threaded bore 410 or bores on the wand inlet tube 206. Alternatively, the set screw 408 may abut the outer surface of the wand inlet tube 206 rather than engage an aligned bore. The set screw 408 may be tightened using an Allen wrench 409 as shown. Of course, the set screw could be replaced by a pin, rivet, or the like.

The cutting element 302 is next prepared for insertion into the wand inlet tube 206 such that the cutting element 302 is rotatingly coupled to the wand 102. The cutting element 302 has a proximal end (or bottom) 502 and a distal end (or top) 504. The orientation of the proximal end 502 and the distal end 504 ensures that the cutting surface 306 will move across the elongated slot 308 in a clockwise direction. Notice, the cutting surface 306 could be oriented such that the cutting surface 306 moves across the elongated slot 308 in a counter-clockwise direction. In still other embodiments, both the leading edge 506 and the trailing edge 508 may be formed into cutting surfaces 306 such that the orientation or rotation of the cutting element 302 is not overly relevant for performance.

Figure 6:
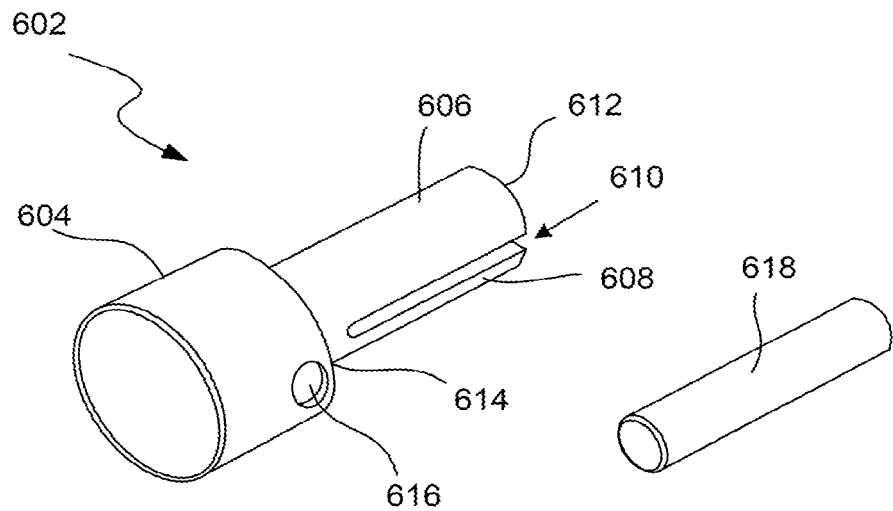
FIG. 6 depicts a perspective view of a driver hub consistent with the technology of the present application.
Figure 7:
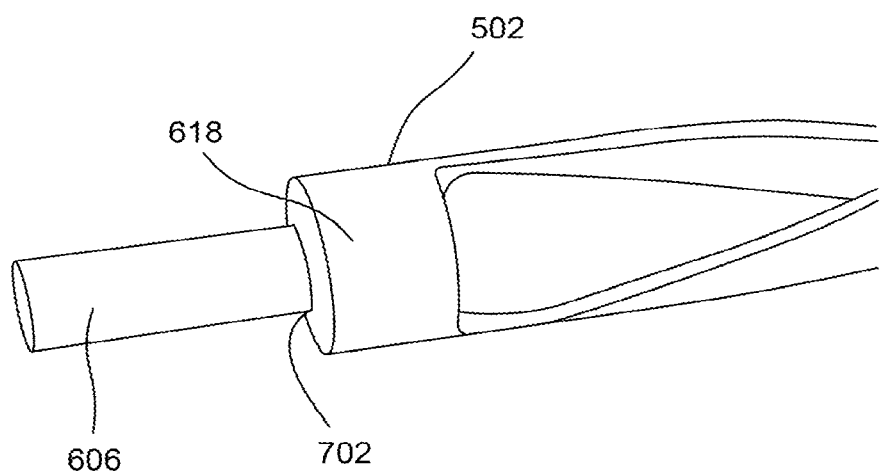
FIG. 7 depicts a perspective view of the driver hub coupled to the cutting element consistent with the technology of the present application.

As shown in FIG. 6, a driver hub 602 has a bottom disc 604 and a drive shaft 606. The drive shaft 606 has a groove 610. The groove 610 includes a central hole and a radially extending slot or channel. The slot may extend from a surface 608 of the drive shaft 606 internal to the central hole of the groove. The groove 610 extends from a proximal end 612 of the driver hub towards, but not completely, to the distal end 614 of the shaft 606. The groove 610 acts as a keyway for the drive 108 as will be explained further below. The bottom disc 604 has a pin bore 616 to receive a pin 618. The bottom disc 604 of the drive hub 602 is inserted into the proximal end 502 (or bottom) of the cutting element 302 until the pin 618 seats against divots 702 (FIG. 5) in the proximal end 502 of the cutting element 302 as shown in FIG. 7.

Figure 8:
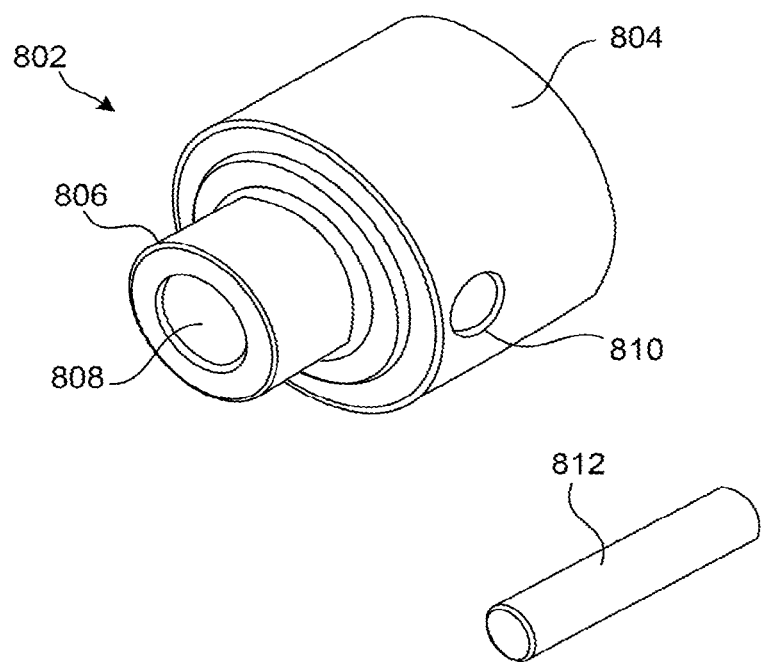
FIG. 8 depicts a perspective view of an idle hub consistent with the technology of the present application.
Figure 9:
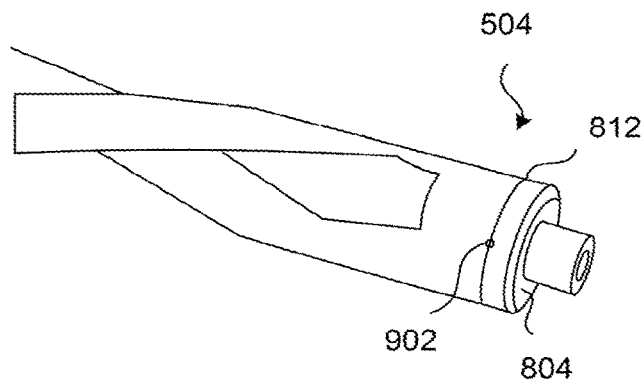
FIG. 9 depicts a perspective view of the idle hub coupled to the cutting element consistent with the technology of the present application.

The distal end 504 of the cutting element 302 receives an idle hub 802 as shown in FIG. 8. The idle hub 802 comprises a top disc 804 and an alignment shaft 806. The alignment shaft has a central alignment bore 808. The top disc 804 has a pin bore 810 to receive a pin 812. The top disc 804 of the idle hub is inserted into the distal end 504 (or top) of the cutting element 302 until the pin 812 seats against divots 902 (FIG. 5) in the distal end 504 of the cutting elements as shown in FIG. 9. As can be appreciated, the driver hub 602 and the idle hub 802 are similar in construction and how they are coupled to the cutting element.

Figure 10:
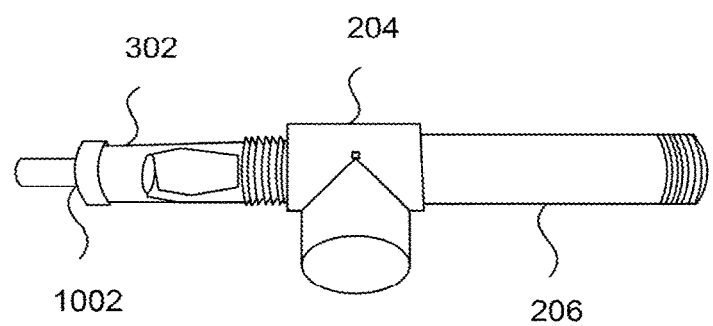
FIG. 10 depicts a perspective view of the cutting element slidably received in a portion of the wand consistent with the technology of the present application.
Figure 11:
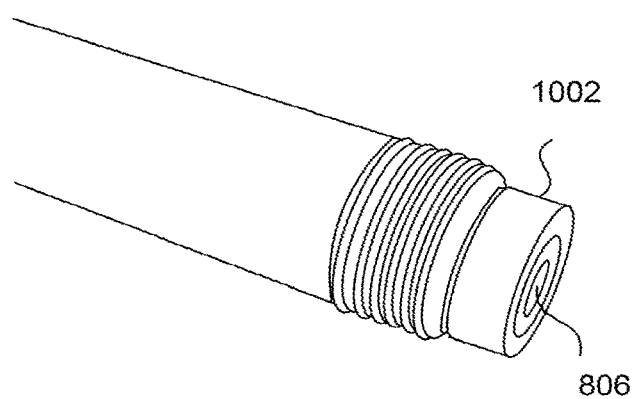
FIG. 11 depicts a perspective view of a bearing coupled to the idle hub consistent with the technology of the present application.

The cutting element 302, with the driver hub 602 and the idle hub 802, is received in the outlet port 204 and the wand inlet tube 206 as shown in FIG. 10. A bearings 1002 is coupled to the driver hub 602 by sliding a bearing 1002 over the drive shaft 606 of the driver hub 602 as shown in FIG. 10. Similarly, a bearing 1002 is coupled to the idle hub 802 by sliding a bearing 1002 over the alignment shaft 806 (FIG. 11). With reference back to FIGS. 2 and 3, housings $1102_{1,2}$ are threaded onto the threads 403 and 401 of the wand inlet tube 206. The housing $1102_1$ proximate the idle hub 802 has a blind hole 1104. One of the bearings 1002 fits in the blind hole 1104 and allows the cutting element to rotate with respect to the housing $1102_1$. The housing $1102_2$ has a through bore with a countersunk shoulder 1106 (see FIG. 3) on which the bearing 1002 rests to allow the cutting element 302 and driver hub 602 to rotate with respect to the housing $1102_2$.

Figure 12:
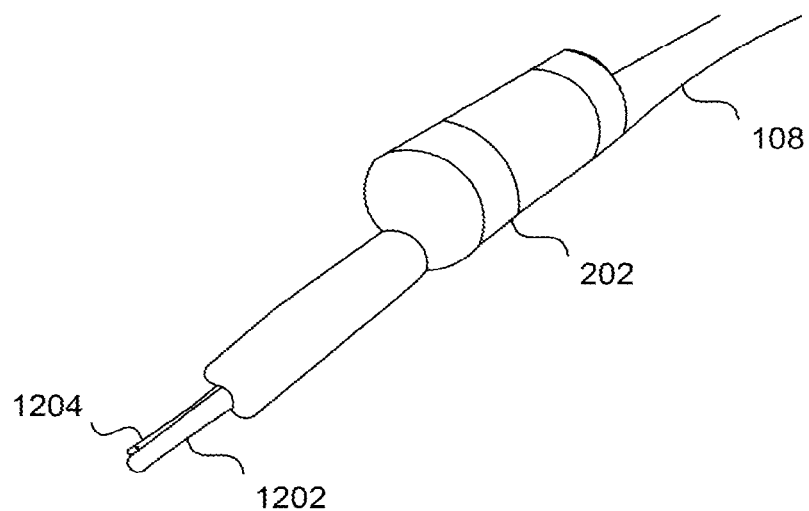
FIG. 12 depicts a perspective view of a drive and a portion of the wand consistent with the technology of the present application.

The motor 104 and the driver hub 602 are coupled using the drive 108. The drive 108, which is shown as a flexible cable, is threaded through the wand handle 202 as shown in FIG. 12. The drive 108 terminates in a rotor 1202 having a protrusion 1204. The protrusion 1204, or key, engages the groove 610, or keyway, in a frictional arrangement. As can be appreciated, when the motor 104 is turned on, the motor rotation is transmitted through the drive 108 to the rotor 1202. The protrusion 1204, which is engaged with the groove 610, rotates with the rotor 1202. Correspondingly, the driver hub 602 rotates. The pin 618 traversing the pin bore 616 rotates with the driver hub 602. The pin 618 are engaged with the detents 702 of the cutting element 302, which in turn cause the cutting element to rotate in the wand 102. The wand handle 202 is threaded onto the threads 401 on the wand inlet tube 206.

As can be appreciated, because the diameter of the cutting element 302 is approximately equal to the inner diameter of the wand inlet tube 206, the cutting element 302 is provided hollow to allow for movement of the plant parts after trimming. Essentially, the vacuum 106 causes a suction that draws the plant part from the elongated slot 308, past the cutting element 302 into a void 301 internal to the cutting element 302 and wand inlet tube 206. The suction further causes the plant parts to travel down the void towards the outlet port 204 and through the flexible conduit 112 to the vacuum. While the diameter of the cutting element 302 is shown as approximately equal to the inner diameter of the wand inlet tube 206, the diameter of the wand inlet tube 206 may be larger, which will be explained further below. The cutting surface 306 of the cutting element 302 generally passes in close proximity to the cutting edge 310 of slot 308 in the of the wand inlet tube 206. If the designed in such a manner, generally the cutting element 302 and the wand inlet tube 206 are offset providing space between the cutting element 302 and an inner wall of the wand inlet tube 206 at a location opposite the slot 308, which allows product to be moved laterally along the handle 202 outside of the cutting element 302.

Figure 13:
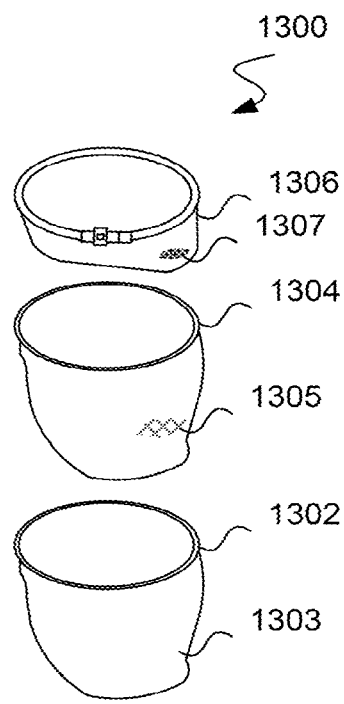
FIG. 13 depicts a perspective view of a filtration system consistent with the technology of the present application.

The plant parts travel the flexible conduit 112 to the inlet of the vacuum 106. The vacuum 106 may contain a filtration system similar to a conventional wet/dry vacuum, for example. In such a case, the plant parts enter the drum 121 of the vacuum 106. A filter (not specifically shown but generally known in the art) is coupled to the outlet of the vacuum 106 to prevent solids of a certain particle size from exiting the vacuum 106 such that the plant parts (all of them over the predefined particle size) are collected in a cavity of the drum 121. As can be appreciated, however, each of the different parts of a plant may have a different use or value. Thus, it may be beneficial to provide an alternative filter bag collection system 1300 at either the inlet or outlet of the vacuum to separate the plant parts. While more or less filter/collectors are possible, FIG. 13 illustrates an exemplary filtration system comprising filter bags 1302, 1304, and 1306. The filter bags 1302, 1304, and 1306 are described with respect to being attached to the outlet of the vacuum 106. The filter bag collection system 1300 may be attached to a tube extending from the outlet port by a hook and loop cinch belt, string, cord, or the like as well as other fastening means. The first filter bag 1302 has a first filter mesh 1303. The first filter mesh 1303 is the largest mesh opening. The second filter bag 1304 has a second filter mesh 1305 and is located between the first filter bag 1302 and the third filter bag 1306 in this exemplary embodiment. The second filter mesh 1305 may have medium mesh openings (as compared to the first filter bag 1302 and the third filter bag 1306). The third filter bag 1306 has the smallest filter mesh 1307. The particles not retained by the third filter bag 1306 may be exhausted or blocked by other upstream filters. From the outside in, because the filter bag collection system 1300 is coupled to the outlet, the third filter bag is contained in the second filter bag that is contained in the first filter bag. The first, second, and third filter bags may include support structure to inhibit the bags from collapsing due to the suction of the vacuum. Alternatively, the filter bag collection system 1300 may be coupled to the inlet of the vacuum 106.

Figure 15:
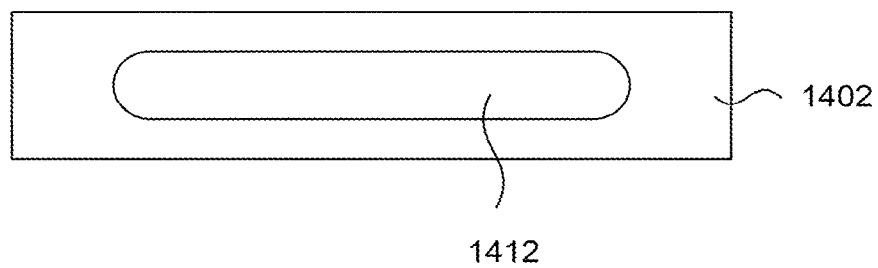
FIG. 15 depicts a portion of the outlet port of FIG. 14.

We reference now to FIGS. 14 and 15, an alternative outlet port 1400 is provided. As mentioned above, outlet port 204 provides a generally "T"-shaped junction or right angle connection to the wand inlet tube 206. The outlet port 1400 rather than a "T"-shape comprises an elongated shape with a wand inlet tube 206 receiving portion 1402, which would comprise a bore 1404 shaped to receive the wand inlet tube 206. The outlet port 1400 further comprises a funnel portion 1406 that tapers from the receiving portion 1402 to a discharge 1408. The funnel portion 1406 would converge to a generally circular opening 1410 to receive the flexible conduit 112 similar to the embodiments described above. As shown in FIG. 15, the receiving portion 1402 would have an elongated inlet 1412 to the funnel portion 1406. The funnel portion 1406 would guide the plant parts to the circular opening 1410 at the discharge into the flexible conduit 112.

Figure 16:
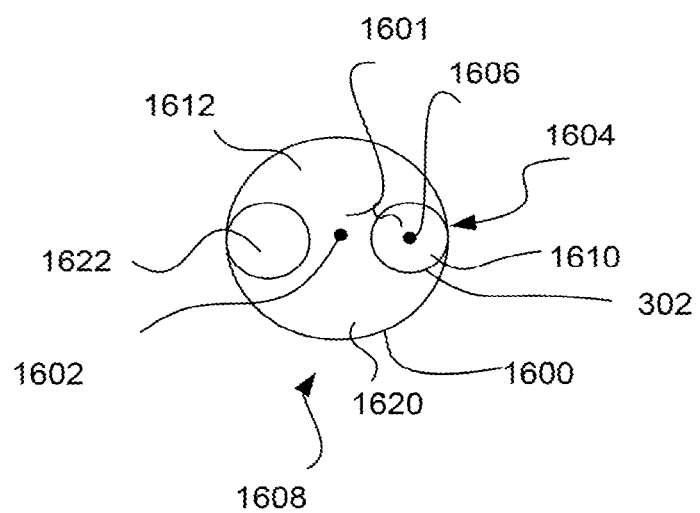
FIG. 16 depicts an alternative configuration of a portion of the wand and the cutting element consistent with the technology of the present application.

As shown and described above, the outer diameter of the cutting element 302 is approximately equal to the inner diameter of the wand inlet tube 206. The size of the cutting element 302 is controlled to provide as close a fit between the cutting surface 306 and the cutting edge 310 to cut the plants without, or at least with limited, tearing. However, other than where the cutting surface 306 passes the cutting edge 310, the cutting element 302 and the inner surface of the wand inlet tube 206 do not necessarily need to be in close relation. With reference to FIG. 16, an alternative wand inlet tube 1600 is shown in cross section. The wand inlet tube 1600 contains a longitudinal axis 1602 at the geometric center of the wand inlet tube 1600 in this exemplary shape. The cutting element 302 is located proximal an inlet port 1604 of the wand inlet tube 1600 to provide the scissor like cutting of the plant parts. The cutting element 302 has a longitudinal axis 1606 at a rotational center that is offset a distance 1601 from the longitudinal axis 1602. Thus, the void 1608 of the wand inlet tube 1600 provides for a part 1610 internal to the blades of the cutting element 302 and a part 1612 external to the cutting element 302.

The wand inlet tube 1600 comprises a base 1620 proximal the wand handle 202 (FIG. 2). As shown, the base 1620 may include an outlet port 1622. The outlet port 1622 is offset from the longitudinal axis 1602 in a direction different than the offset for the rotational center. As can be appreciated, the outlet port 1622 is parallel with the longitudinal axis of the wand inlet tube 1600 rather than perpendicular, as shown and described above. While the helical blade described above may be used for the configuration of the device shown in FIG. 16, the cutting element 302 may be solid in certain aspects rather than hollow. In this exemplary embodiment, the cutting surface may be formed by milling a groove in an outer surface of the cutting element 302 to form the cutting surface 308.

Although the technology has been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A plant trimming apparatus comprising:
    a wand having a wand longitudinal axis, the wand comprising:
        a wand inlet tube defining a void and having a proximal end and a distal end opposite the proximal end, the wand inlet tube comprising an elongate slot placing the void in fluid communication with an exterior of the wand inlet tube, the elongate slot being in a side of the tube and substantially aligned in the longitudinal direction;
        an outlet port having a first bore parallel to the wand longitudinal axis and a second bore, the proximal end of the wand inlet tube receivable in the first bore, the second bore in fluid communication with the void, the second bore being configured to be coupled with a vacuum source;
        a cutting element rotatably contained in the void defined by the wand inlet tube and having a cutting surface spaced at a distance from the rotational center of the cutting element, and
    a handle; and a motor;
    a drive configured to couple the motor to the cutting element such that the motor rotates the cutting element; wherein
    the wand inlet tube has a first inner diameter with an axis at a geometric center of the wand inlet tube that is parallel to the longitudinal direction, and the rotational center of the cutting element is parallel to the longitudinal direction and offset from the inlet tube axis.

2. The apparatus of claim 1 wherein a vacuum is coupled to the outlet port by a flexible conduit.

3. The apparatus of claim 1 wherein the second bore of the outlet port is an outlet bore and the outlet bore has an axis perpendicular to the wand longitudinal axis.

4. The apparatus of claim 1 wherein the second bore of the outlet port is an outlet bore and the outlet bore has an axis parallel to the wand longitudinal axis.

5. The apparatus of claim 1 wherein the cutting element is hollow and comprises a plurality of curved cutting blades.

6. The apparatus of claim 5 wherein each of the curved cutting blades has a cutting surface and the elongate slot has a cutting edge wherein the cutting surface rotates in close relation to the cutting edge to slice at least a plant part.

7. The apparatus of claim 5 wherein the void defined by the wand inlet tube comprises a first part internal to hollow cylindrical cutting element and a second part external to the hollow cutting element.

8. The apparatus of claim 1 wherein the handle is part of the wand and opposite the wand inlet tube.

9. The apparatus of claim 2 wherein the handle is at least one of the second bore and the flexible conduit.

10. The apparatus of claim 1 wherein the second bore comprises:
- a receiving portion shaped to cooperatively receive the wand inlet tube, the receiving portion comprising an inlet in fluid communication with the void;
- a discharge portion shaped to cooperatively receive a conduit placing the void in fluid communication with the drum; and
- a funnel portion extending between the receiving portion and the discharge portion.

11. The apparatus of claim 10 wherein the funnel portion tapers from the receiving portions to the discharge portion.

12. The apparatus of claim 10 wherein the discharge portion has a circular cross-sectional shape.

13. A method of trimming a plant product comprising:
providing a wand having a wand longitudinal axis, the wand comprising:
- a wand inlet tube defining a void and having a proximal end and a distal end opposite the proximal end, the wand inlet tube comprising an elongate slot placing the void in fluid communication with an exterior of the wand inlet tube, the elongate slot being in a side of the tube and substantially aligned in the longitudinal direction;
- an outlet port having a first bore parallel to the wand longitudinal axis and a second bore, the proximal end of the wand inlet tube receivable in the first bore, the second bore in fluid communication with the void, the second bore being configured to be coupled with a vacuum source;
- a cutting element rotatably contained in the void defined by the wand inlet tube and having a cutting surface spaced at a distance from the rotational center of the cutting element, and
- a handle; wherein the wand inlet tube has a first inner diameter with an axis at a geometric center of the wand inlet tube that is parallel to the longitudinal direction, and the rotational center of the cutting element is parallel to the longitudinal direction and offset from the inlet tube axis;
placing the opening of the wand proximal a plant product;
rotating the cutting element in the wand inlet tube;
touching the wand to the plant product such that plant product enters the void through the slot and the curve cutting surface cuts the plant product from a plant as the cutting element rotates past a cutting edge of the opening; and
moving the plant product from the opening and through the void.

14. A wand for a plant trimming system, the wand comprising:
- a wand inlet tube have a wand tip at an end thereof, the wand inlet tube having an elongated slot with an edge;
- a wand handle having a wand base at an end thereof;
- an outlet port connected to and between the wand inlet tube and the wand handle, the outlet port having a first bore and a second bore;
- wherein a wand axis extends from the wand Up to the wand base and a port axis extends from the second bore of the outlet port and is generally perpendicular to the wand axis;
- the elongated slot being formed in a side of the wand inlet tube and substantially parallel to the wand axis;
- a hollow, cylindrical cutting element with a top and a bottom opposite the top, the hollow, cylindrical cutting element comprises at least a pair of helically shaped blades with leading edge cutting surfaces rotationally contained within the wand inlet tube;
- the wand inlet tube has a first inner diameter with an axis at a geometric center of the wand inlet tube that is parallel to the wand axis, and the rotational center of the cutting element is parallel to the wand axis and offset from the inlet tube axis;
- a drive hub coupled to the bottom of the hollow, cylindrical cutting element, the drive hub comprising a drive shaft with a groove the drive hub configured to be coupled to a motor wherein the motor is configured to cause the drive hub and the hollow, cylindrical cutting element to rotate; and
- an idle hub coupled to the top of the hollow, cylindrical cutting element.

15. The wand of claim 14 wherein the drive hub and the idle hub are coupled to bearings to allow the drive hub and the idle hub to rotate.

* * * * *